3,767,608
PRESSURE SENSITIVE COLD SEALING MATERIAL
Edwin C. Hand, Parma, Ohio, assignor to
Parr, Inc., Cleveland, Ohio
No Drawing. Filed Sept. 9, 1971, Ser. No. 179,204
Int. Cl. C08f 45/04, 45/14, 45/52
U.S. Cl. 260—28.5 R                                                5 Claims

ABSTRACT OF THE DISCLOSURE

A waterproof and weatherproof tape is provided which is pressure sensitive at ambient temperatures and which has exceptional adhesion to the surface of all building materials so that it is quickly and easily applied for patching, flashing, sealing, expansion joints and other applications of a similar nature.

BACKGROUND OF THE INVENTION

Heretofore, such materials as mastics, glass mat, felt, etc., were used for patching and flashing and for sheet sealing, and were fastened to the underlying surfaces with adhesives of different viscosities. These previously known sealing materials involved adhesives usually including around 25 to 40 percent of solvents, often aliphatic, aromatic, etc., which evaporating, caused some pollution to be dissipated into the atmosphere and causing a shrinkage of the sealing material after the adhesive solvent had evaporated. Such previous materials usually were flammable, say with a 100 degree flash point, they were messy to handle and apply, requiring spatulas or trowels, usually could not stand stretching or compression, did not have the ability to be molded to irregular surfaces, were slow in methods of application, were subject to oxidation and film forming and quite often needed an additional membrane for reinforcement.

SPECIFICATION

An object of the present invention is to provide a pressure sensitive tape comprising approximately 100 percent solids, with no evaporative solvent, with a high flash point, easy to apply, not sticking to the hands, with no tools required, with about 200 percent elongation, the ability to remain flexible substantially indefinitely, low water vapor permeability, indefinite storage life, speed of application with no special tools required, no additional membrane necessary for reinforcement, and with excellent ability to stand stretching and compression and to be molded to irregular surfaces.

Another object of this invention is to provide a waterproof and weatherproof tape, which is pressure sensitive at ambient temperatures and permanently flexible, which consists substantially of 100 percent solids and comprises a homogeneous mixture of synthetic rubber, plasticizer and filler, so combined as to provide a tape having a flash point of about 480 degrees Fahrenheit, elongation of about 200 percent at 77 degrees Fahrenheit, Shore hardness of about 16 on Scale A, specific gravity of about 1.551 at 60 degrees Fahrenheit, water vapor permeability of 0.05 percent maximum, ability to mold irregular surfaces and exceptional adhesion to the surfaces of all building materials.

Other objects and advantages of the invention will be described in the accompanying specification and the essential features thereof will be set forth in the appended claims.

The novel tape of this invention comprises a base of synthetic rubber, a plasticizing material, and a major percentage of fillers to provide the physical parameters set forth herein. The synthetic rubber may comprise butyl, isoprene, isobutylene, chlorosulfonated polyethylene, or a polymerization of chloroprene, and the like. The plasticizer may include a high viscosity paraffinic oil, castor oil, chlorinated paraffin, polybutane or a lubricating grease formed by flushing a waterproofed aluminum oxide hydrate from an aqueous suspension with a major amount of lubricating oil, as set forth more fully hereinafter. The fillers may include magnesium silicate, calcium carbonate, asbestos fibers, and other suitable fillers. Used also, in some formulations, is an oxidized asphalt which may be regarded partially as a filler and partially as a plasticizer.

One of the plasticizers referred to herein in Examples 1 and 2 as "aluminum oxide gel grease," and in the claims as "a lubricating grease formed by flushing a waterproofed aluminum oxide hydrate from an aqueous suspension with a major amount of lubricating oil" is fully described and claimed in U.S. Pat. No. 3,174,930, granted Mar. 23, 1965 to V. R. Damerell and incorporated herein by reference. This prior patent describes a method of preparing a lubricating grease which comprises flushing a waterproofed aluminum oxide hydrate from an aqueous suspension with a major amount of a mineral lubricating oil to obtain a grease composition; the hydrate being prepared by reacting aluminum sulfate with an alkali metal carbonate in an aqueous solution at a temperature below the boiling point of the solution to obtain a precipitate, boiling said precipitate for a period sufficient to obtain an aqueous suspension of aluminum oxide hydrate and reacting the hydrate with an anionic surface active agent to obtain a waterproofed gelling agent.

The following are examples of formulations for preparing the waterproof tape of this invention, the amounts of the ingredients being expressed in pounds.

EXAMPLE 1

Butyl rubber _____ 120
Asphalt _____ 150
Aluminum oxide gel grease _____ 230
Antioxidant _____ 2
Magnesium silicate _____ 350
Calcium carbonate _____ 450
Asbestos _____ 100

EXAMPLE 2

Butyl rubber _____ 200
Asphalt _____ 100
Aluminum oxide gel grease _____ 250
Antioxidant _____ 2
Magnesium silicate _____ 300
Calcium carbonate _____ 350
Asbestos _____ 50

EXAMPLE 3

Hypalon _____ 150
Chlorowax _____ 300
Antioxidant _____ 2
Magnesium silicate _____ 400
Calcium carbonate _____ 300
Asbestos _____ 100

In the above example, Hypalon is a trademark of E. I. du Pont de Nemours & Company for chlorosulfonated polyethylene. Chlorowax is a trademark of the Diamond Alkali Company for a chlorinated paraffin containing 40 percent combined chlorine by weight.

EXAMPLE 4

Neoprene _____ 150
Chlorowax _____ 300
Antioxidant _____ 2
Magnesium silicate _____ 400
Calcium carbonate _____ 300
Asbestos _____ 100

In the above example, Neoprene is a trademark of The Carboline Company for a polymerization of chloroprene.

Examples Nos. 3 and 4 are for fire and heat resisting compositions.

The antioxidant set forth in the above examples could be any one of a number of chemically acceptable antioxidants but the particular one used in the examples was zinc dibutyldithio carbamate sold under the trade name Butyl Zimate by R. T. Vanderbilt Company, Inc.

In preparing the above named examples, the ingredients were placed in a heavy duty Baker-Perkins mixer and mixed for about one-half hour without the application of any outside heat. The mixture was then dumped and extruded into a flat ribbon, after which the ribbon was rolled with a separating strip of release paper between adjacent layers of the strip or tape.

It should be understood that in the use of this invention a piece of the required size is cut from the ribbon as rolled in manufacture, after which the release paper is separated from the strip or tape, then the severed tape material is pressed against the surface for flashing, patching or sealing and firmly pressed down. One of the advantages of this invention over the prior art is that no period of aging is necessary prior to applying aluminum paint or other coating. Such a coating can be applied immediately after the tape of this invention has been placed in position. As stated previously, the tape of this invention is able to stand stretching and compression and may be easily molded to irregular surfaces.

The tape of this invention may be used to repair roofs, parapets, copings, and flashings. It has tenacious adhesion, even bonding to damp surfaces. It may be used to repair roof blisters, open seams, cracks, gutters, copings, etc. It may be used to seal metal caskets, burial vaults, transformers, air conditioning ducts and chambers, and ventilators. It may be used as an insulator or an anti-squeak material in assembling metal parts. It may be used for sealing the places of entrance of conduit and pipe into construction walls. It may be also used as a sound deadener for automobiles and trucks. It may be used as a convenient instant seal in order to make a structure waterproof and to protect the surfaces therebeneath from deteriorating. This invention is also particularly suited for treating expansion joints and cracks in structures such as garage decks, roads, etc., where heavy traffic may be required immediately. It such a case, the pressure sensitive synthetic rubber tape of this invention provides a surface to which a film of polyethylene terephthalate resin sold under the trademark Mylar by E. I. du Pont de Nemours & Company may be adhered to the upper surface of the tape of this invention where traffic may be in contact with the same.

What is claimed is:

1. A waterproof and weatherproof tape, pressure sensitive at ambient temperatures and permanently flexible, consisting of substantially 100 percent solids and comprising a homogeneous mixture of synthetic rubber, chosen from the group consisting of butyl, isoprene, isobutylene, chlorosulfonated polyethylene, and polyvinyl chloroprene, and a plasticizer chosen from the group consisting of high viscosity paraffinic oil, castor oil, chlorinated paraffin, polybutane, and aluminum oxide gel grease, and filler chosen from the group consisting of magnesium silicate, calcium carbonate, asbestos and asphalt; the proportionate amounts by weight being from about 120 parts to about 200 parts of synthetic rubber, from about 300 parts to about 380 parts of plasticizer, and from about 800 parts to about 1050 parts of filler, and so combined as to provide a tape having a flash point of about 480 degrees F., elongation of about 200 percent at 77 degrees F., ability to mold to irregular surfaces, water vapor permeability 0.05 percent maximum, Shore hardness about 16 (Scale A), specific gravity about 1.551 at 60 degrees F., and exceptional adhesion to the surface of all building materials.

2. A waterproof and weatherproof tape as defined in claim 1, comprising about 8 to 18 percent synthetic rubber, about 6 to 12 percent asphalt, about 15 to 25 percent of said aluminum oxide gel grease, and the balance inert fillers.

3. A waterproof and weatherproof tape, as defined in claim 1, wherein said synthetic rubber comprises about 10 to 15 percent of a chlorinated synthetic rubber and said plasticizer comprises about 20 to 25 percent of a chlorinated paraffin.

4. A waterproof tape, pressure sensitive at ambient temperatures and permanently flexible comprising a homogeneous mixture essentially, stated as parts by weight, of 120 parts butyl rubber, 150 parts asphalt, 230 parts aluminum oxide gel grease, 350 parts magnesium silicate, 450 parts calcium carbonate, and 100 parts asbestos.

5. A waterproof tape, pressure sensitive at ambient temperatures and permanently flexible comprising a homogeneous mixture essentially, stated as parts by weight, of 200 parts butyl rubber, 100 parts asphalt, 250 parts aluminum oxide gel grease, 300 parts magnesium silicate, 350 parts calcium carbonate, and 50 parts asbestos.

References Cited

Damusis: Sealants, Rheinhold Publishing Corporation, New York, 1967, pp. 307–313 relied on.

MORRIS LIEBMAN, Primary Examiner

S. L. FOX, Assistant Examiner

U.S. Cl. X.R.

260—28.5 A, 28.5 AS, 28.5 B, 41.5 R